(12) United States Patent
Oh (10) Patent No.: US 7,103,397 B2
(45) Date of Patent: Sep. 5, 2006

(54) APPARATUS TO MOUNT A MOBILE DEVICE IN A VEHICLE

(75) Inventor: Sang-Kil Oh, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 435 days.

(21) Appl. No.: 10/197,839

(22) Filed: Jul. 19, 2002

(65) Prior Publication Data

US 2003/0068986 A1 Apr. 10, 2003

(30) Foreign Application Priority Data

Oct. 9, 2001 (KR) ................................ 2001-62051

(51) Int. Cl.
*H04M 1/00* (2006.01)
(52) U.S. Cl. ................. 455/575.9; 455/556.1; 455/556.2; 455/90.3; 379/446; 379/454; 379/455
(58) Field of Classification Search ............. 455/556.1, 455/556.2, 575.9, 90.3; 379/446, 454, 455; 248/309.1
See application file for complete search history.

(56) References Cited

U.S. PATENT DOCUMENTS

| | | | | |
|---|---|---|---|---|
| 4,868,862 A | * | 9/1989 | Ryoichi et al. | ............. 455/572 |
| 5,054,011 A | * | 10/1991 | Alves | ........................... 369/12 |
| 5,129,616 A | * | 7/1992 | Carson | ........................ 248/457 |
| 5,176,362 A | * | 1/1993 | Seksaria et al. | ............. 254/126 |
| 5,896,564 A | * | 4/1999 | Akama et al. | ........... 455/575.9 |
| 6,173,933 B1 | * | 1/2001 | Whiteside et al. | ....... 248/276.1 |
| 6,243,463 B1 | * | 6/2001 | Cheon | ........................ 379/446 |

* cited by examiner

*Primary Examiner*—Matthew Anderson
*Assistant Examiner*—Sanh Phu
(74) *Attorney, Agent, or Firm*—Staas & Halsey LLP

(57) ABSTRACT

An apparatus to mount a mobile device having a main body with a receiving recess to receive the mobile device, a first locker to support and secure a lower part of the mobile device, a second locker for elastically supporting and securing an upper part of the mobile device to lock up or release the upper part of the mobile device, a lock/release disposed to be movable between a locking position of locking up the mobile device and a releasing position to release the mobile device from the lock-up state, an ejector to lift the mobile device in a given distance when the lock/release is moved to the releasing position, and a mounting fixture including position adjusting units to adjust an angle and a height of the main body and fixing units to fix the position adjusting unit in the vehicle. Accordingly, since the apparatus has the lock/release and the ejector to automatically lock and release the mobile device and the mounting fixture to adjust the position of the main body, mounting and removing the mobile device as well as setting up the apparatus itself and the mobile device in the vicinity of the glass window of the vehicle to ensure the GPS receiver of the mobile device freely to receive and transmit radio waves from satellites at the inside of the vehicle can be easily carried out.

17 Claims, 6 Drawing Sheets

APPARATUS TO MOUNT A MOBILE DEVICE IN A VEHICLE

CROSS-REFERENCE TO RELATED APPLICATIONS

This application claims the benefit of Korean Application No. 01-62051, filed Oct. 9, 2001, in the Korean Industrial Property Office, the disclosure of which is incorporated herein by reference.

BACKGROUND OF THE INVENTION

1. Field of the Invention

The present invention relates to an apparatus to mount a portable or mobile device such as a personal digital assistant (PDA), a portable telephone, etc., in a vehicle, and more particularly to an apparatus to mount a portable or mobile device having a global positioning system (GPS) in the vehicle.

2. Description of the Related Art

Generally, in the position measurement operation using a GPS, a location in space is obtained by receiving radio waves indicating latitude, longitude, altitude, etc., from at least three satellites through a GPS receiver and then calculating each of the distances from the satellites by trigonometry. This position measurement technology using the GPS is now applied to various fields including furnishing of simple position information, precise measurement of large public works, cartography, automatic navigation of ships, aircrafts and vehicles, etc. Particularly, in recent years, as a mobile device such as a PDA or a portable telephone containing the GPS receiver is placed on the market, anybody can have an access to GPS information.

However, the GPS information is more frequently used inside of the vehicle rather than in general real life due to a characteristic of geometrical information. Accordingly, to receive and transmit the radio waves from the satellites inside of the vehicle, the GPS receiver of the mobile device has to be disposed toward the satellites as well as in the vicinity of a glass window of the vehicle. However, up to now, an apparatus to mount the GPS receiver or the mobile device containing the GPS receiver in the vehicle to conform the above conditions has not been developed.

SUMMARY OF THE INVENTION

Accordingly, it is an object of the present invention to provide a new apparatus to mount a mobile or portable device such as a PDA or a portable telephone having a GPS receiver in a vehicle, which can be easily set up in the vicinity of a glass window of the vehicle to ensure the mobile device freely receives and transmits radio waves from satellites.

It is another object of the present invention to provide a new apparatus to mount a mobile device in a vehicle, which enables easy mounting and removal of the mobile device.

Additional objects and advantages of the invention will be set forth in part in the description which follows and, in part, will be obvious from the description, or may be learned by practice of the invention.

The foregoing and other objects of the present invention are achieved by providing an apparatus to mount a mobile device such as a PDA or a portable telephone in a vehicle comprising: a main body having a receiving recess to receive the mobile device; a first locker to support and secure a lower part of the mobile device when the mobile device is inserted in the receiving recess, a second locker to elastically support and secure an upper part of the mobile device, to lock up the upper part of the mobile device when the mobile device is inserted into the receiving recess and to release the upper part of the mobile device from the lock-up state when a force to remove the mobile device from the receiving recess is imparted on the mobile device; and a mounting fixture including at least one position adjusting unit having one end connected with the main body to adjust an angle and a height of the main body positioned in the vehicle, and at least one fixing unit formed on the other end of the position adjusting unit to fix the position adjusting unit in the vehicle.

In an embodiment of the invention, the first locker comprises: at least one projection hanger formed to project from one wall of the receiving recess; and at least one projection hanger-receiving groove formed at a corresponding portion of the mobile device to receive the projecting hanger and thereby to support and secure the lower part of the mobile device.

The second locker comprises: an elastic hanger having a hanging end disposed at another wall of the receiving recess to be elastically projected from and inserted into the other wall; and an elastic hanger-receiving groove formed at the upper part of the mobile device to lock up the mobile device by engaging with the hanging end of the elastic hanger when the mobile device is inserted into the receiving recess.

The position adjusting unit is formed of two pieces, each of which comprises: a support fixed to the main body; and a supporting leg connected with the support, having a fold with a lower end foldable at a given length to adjust the position of the main body together with the support.

In one aspect of the invention, the fixing unit comprises: an adhesive-fixing portion to adhere the lower end of the fold of one among two position adjusting unit to a portion to be adhered in the vehicle, and a hook-fixing member to fix the lower end of the fold of the other one among the two position adjusting units by being inserted between a glass window and the portion to be adhered in the vehicle.

Also, the apparatus of the invention may include a lock/release disposed to be movable between a locking position of locking up the mobile device to prevent the mobile device from being ejected in cooperation with the first and second lockers when the mobile device is completely inserted into the receiving recess and a releasing position of releasing the mobile device from the lock-up state to enable the mobile device to be ejected when the mobile device is to be removed, and an ejector to lift the mobile device by a given distance to make the mobile device easily removable when the lock/release is moved to the releasing position.

The lock/release comprises: a locking unit to lock up the mobile device when the mobile device is inserted into the receiving recess; a releasing unit connected with the locking unit to release the locking unit from the lock-up state when the mobile device is to be removed; and an elastic returning unit to provide an elastic force to ensure the locking unit and the releasing unit are maintained in the locking position of locking up the mobile device.

In another aspect of the invention, the locking unit comprises: a locking groove formed at a surface of the mobile device and having an engaging member; and a hook member disposed to be projected from a bottom of the receiving recess and movable between an engaging position engaging with the engaging member of the locking groove and a disengaging position disengaging from the engaging member to engage with or disengage from the engaging member when the mobile device is inserted into or removed from the receiving recess, and the releasing unit comprises a release button to remove the hook member between the engaging position and the disengaging position, connected with the hook member of the locking unit and projected from an upper surface of the main body at one side thereof.

Also, the elastic returning unit comprises: an elastic spring to elastically urge the hook member and the release button connected thereto to be moved to the engaging position, disposed between the release button and a support plate formed in the main body; and a support rod to receive and support the elastic spring, connected to the release button.

The ejector comprises an elastic unit having an ejecting end disposed at the bottom of the receiving recess to be able to be projected from or inserted into the bottom.

In an aspect of the invention, the elastic unit is formed of a leaf spring having the ejecting end in which a tip is rounded and an elastic force larger than that of the elastic hanger of the second locker to eject the mobile device by the given distance by disengaging the elastic hanger of the second locker from the elastic hanger-receiving groove when the releasing unit of the lock/release is moved to the releasing position of releasing the locking unit from the lock-up state.

The foregoing and other objects of the present invention may also be achieved by providing an apparatus to mount a mobile device such as a PDA or a portable telephone in a vehicle comprising: a main body having a receiving recess to receive the mobile device; a first locker to support and secure one end of the portable device when the mobile device is inserted into the receiving recess; a lock/release disposed to be movable between a locking position to lock up the mobile device to prevent the mobile device from being ejected in cooperation with the first locker when the mobile device is completely inserted into the receiving recess and a releasing position to release the lock-up of the mobile device to enable the mobile device to be ejected when the mobile device is to be removed; an ejector to lift the mobile device by a given distance to make the mobile device easily removable when the lock/release is moved to the releasing position, and a mounting fixture including at least one position adjusting unit having one end connected with the main body to adjust an angle and a height of the main body positioned in the vehicle; and at least one fixing unit formed on the other end of the position adjusting unit to fix the position adjusting unit in the vehicle.

The apparatus to mount the mobile device of the invention may further comprise: a second locker to elastically support and secure the other end of the mobile device, to lock up the other end of the mobile device when the mobile device is inserted into the receiving recess and to release the other end of the mobile device from the lock-up state when a force to remove the mobile device from the receiving recess imparted on the mobile device is above a given range. At this time, a force of the ejector to lift the mobile device by the given distance may be set to be larger than the force to remove the mobile device from the receiving recess imparted on the mobile device when the other end of the mobile device begins to be released from the lock-up state.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF PREFERRED EMBODIMENTS

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 1:
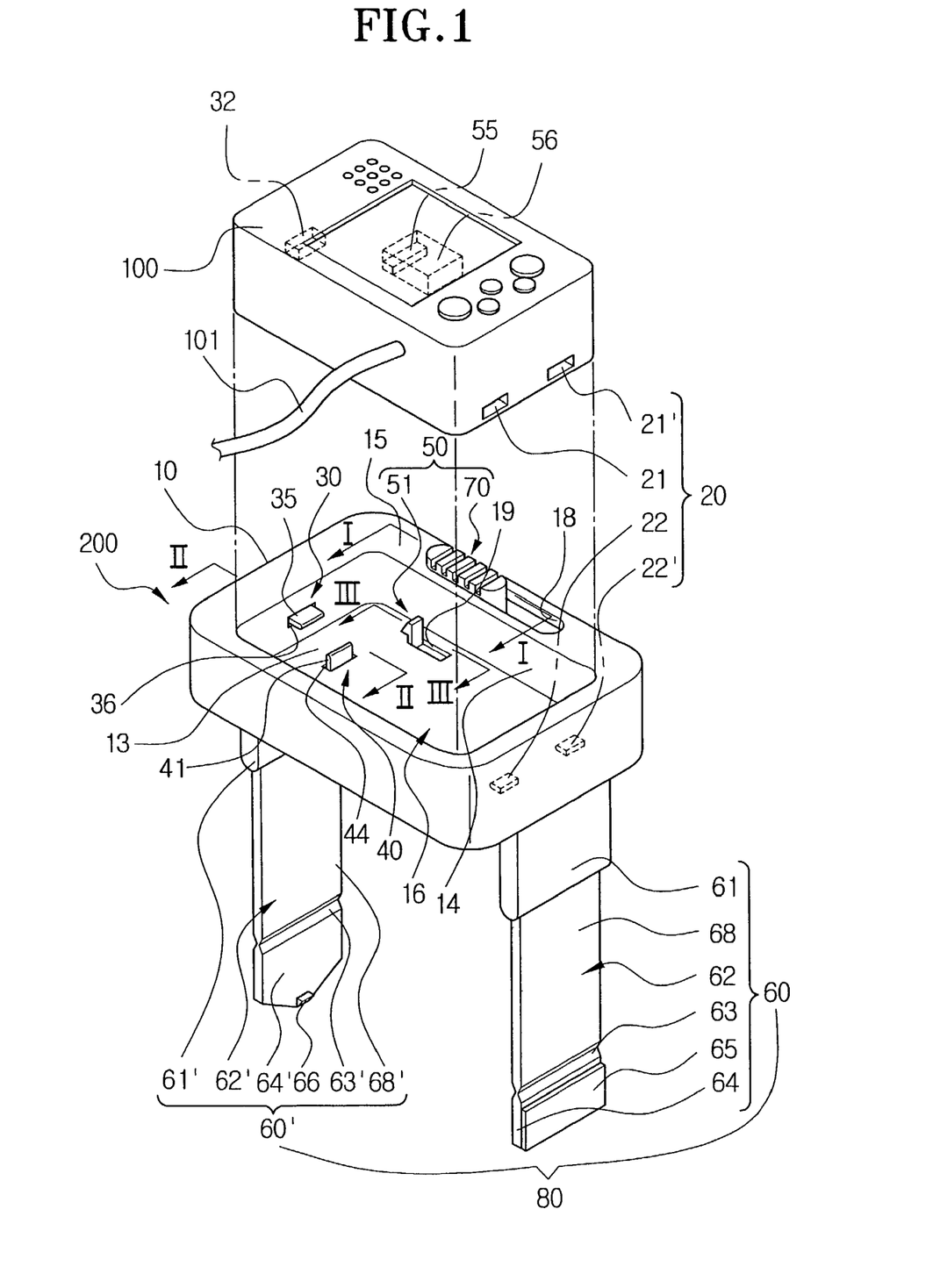
FIG. 1 is a perspective view of an apparatus to mount a mobile device in a vehicle in accordance with an embodiment of the present invention.

Referring now to FIG. 1, there is illustrated an apparatus 200 to mount a PDA 100 containing a GPS receiver (not shown) in a vehicle in accordance with the present invention. Here, it will be noted that the apparatus 200 of the present invention is illustrated as used to mount the PDA 100, but the present invention is not limited to this and can be used with other mobile devices, such as a portable telephone having the GPS receiver.

The apparatus 200 according an embodiment of the invention comprises a main body 10 having a receiving recess 16 to receive the PDA 100 in which the GPS receiver is connected to a jack (not shown) to connect a power supply of the vehicle through an electric wire 101, a first locker 20 to support and secure a lower part of the PDA 100 when the PDA 100 is inserted into the receiving recess 16, a second locker 30 to elastically support and secure an upper part of the PDA 100, to lock up the upper part of the PDA 100 when the PDA 100 is inserted into the receiving recess 16 and to release the upper part of the PDA 100 from the lock-up state when a force to remove the PDA 100 from the receiving recess 16 is applied to the PDA 100, and a mounting fixture 80 to adjust an angle and a height of the main body 10 and fix the main body 10 in the vicinity of a front glass window 12 of the vehicle.

The first locker 20 has first and second projection hangers 22 and 22', respectively, each of which is formed to project from a side wall 14 positioned at a lower side (a right side in FIG. 1) of the receiving recess 16, and first and second projection hanger-receiving grooves 21 and 21', each of which is formed at the lower part of the PDA 100 to receive the corresponding first or second projecting hangers 22 and 22' and thereby to support and secure the lower part of the PDA 100. The first and second projecting hangers 22 and 22' and the first and second projection hanger-receiving grooves 21 and 21' are engaged with each other to support the lower part of the PDA 100 while the PDA 100 is inserted into the receiving recess 16 and to secure the lower part of the PDA 100 in the receiving recess 16 after the PDA 100 is completely inserted into the receiving recess 16.

Figure 5:
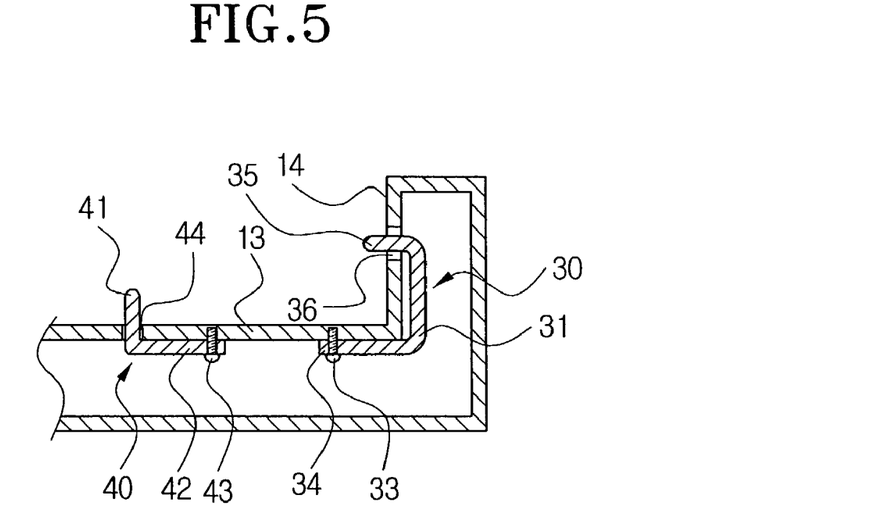
FIG. 5 is a partial cross-sectional view of a second locker and an ejector of the apparatus of the present invention taken along lines II—II of FIG. 1.

As illustrated in FIGS. 1 and 5, the second locker 30 has an elastic hanger 31 having a hanging end 35 disposed in the side wall 14 positioned at an upper side (left-hand side of FIG. 1) of the receiving recess 16 to be elastically projected from and inserted into the side wall 14 through a hole 36 therein, and an elastic hanger-receiving groove 32 formed at the upper part of the PDA 100 to lock up the PDA 100 by engaging with the engaging end 35 of the elastic hanger 31 when the PDA 100 is inserted into the receiving recess 16. The elastic hanger 31 is preferably formed of a leaf spring, in which a tip of the engaging end 35 is rounded and a fixing end 34 is fixed on an under-surface of a bottom 13 by a fixing member 33 such as a bolt. Also, the elastic hanger-receiving groove 32 has a rounded upper edge to be in smooth contact with the hanging end 35 of the elastic hanger 31 when the PDA 100 is inserted into or removed from the receiving recess 16.

Figure 6A:
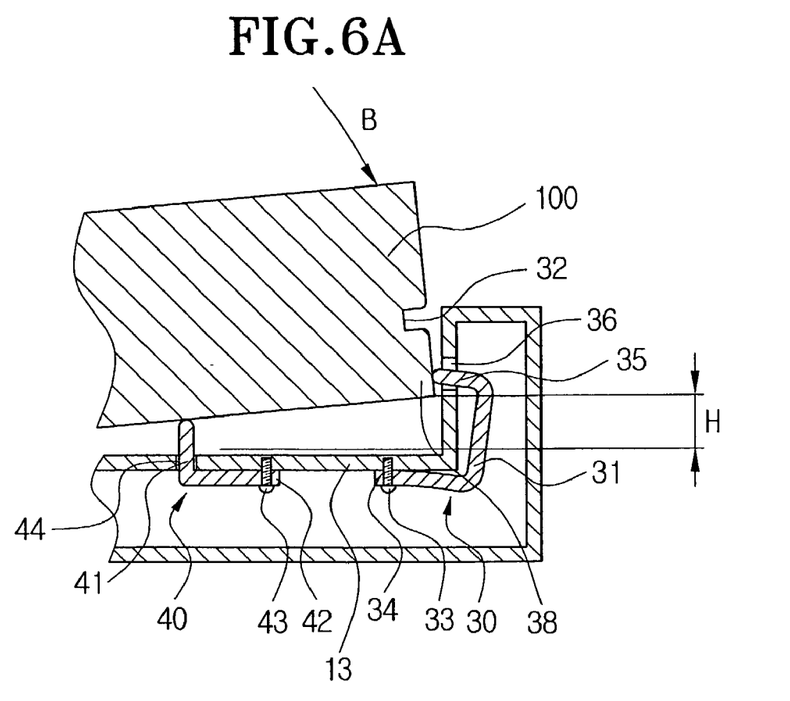
FIGS. 6A and 6B are partial cross-sectional views of the second locker and the ejector illustrated in FIG. 5.
Figure 6B:
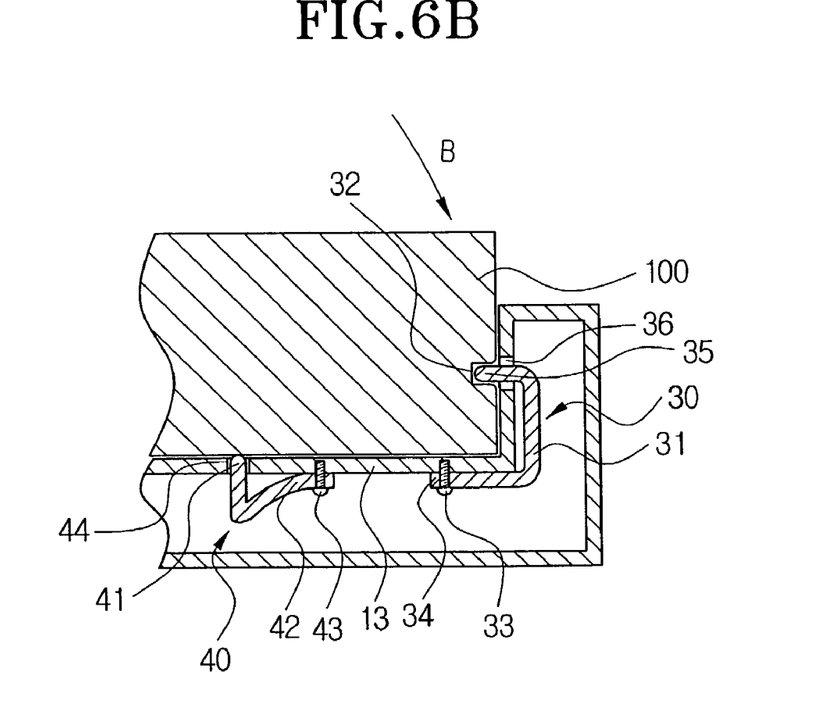

Accordingly, as illustrated in FIG. 6A, the elastic hanger 31 of the second locker 30 releases the PDA 100 from the lock-up state by disengaging from the elastic hanger-receiving groove 32 when the PDA 100 is removed from the receiving recess 16 of the main body 10, and as illustrated in FIG. 6B, locks up the PDA 100 by engaging with the elastic hanger-receiving groove 32 when the PDA 100 is inserted into the receiving recess 16 of the main body 10.

Referring again to FIGS. 1 and 2, the mounting fixture 80 comprises first and second fixing units 60 and 60', each of which is bendable by a hinge and a fold to adjust an orientation, i.e., the angle and the height of the main body 10 positioned in the vehicle.

The first fixing unit 60 has a first position adjusting unit which comprises a first mount 61 hinged by a first hinge 67 at a lower part (right-hand side of FIG. 1) of the main body 10 and a first supporting leg 62 fixed to the first mount 61; and an adhesive-fixing portion 65 to adhere the first supporting leg 62 to a portion 11 of the vehicle, formed on the first lower end 64 of the first supporting leg 62.

The first supporting leg 62 has a first fold 63 to fold a first lower end 64 by a given length to adjust the angle and the height of the lower part of the main body 10 in the vehicle together with the first hinge 67. The first fold 63 assumes a structure in which v-shaped notches are formed at both faces of the first supporting leg 62 to be able to bend the first lower end 64 of the first supporting leg 62 at a given angle.

In one aspect of the invention the adhesive-fixing portion 65 is formed of an adhesive such as a both-sided adhesive tape, and the first supporting leg 62 to be adhered by the adhesive-fixing portion 65 is formed of thermoplastic polyurethane (TPU) from which the adhesive is not easily detached. Also, the first lower end 64 of the first supporting leg 62 may be formed of a thin thickness enough to assist the adhering of the adhesive and to be easily bent according to a shape of the portion 11 of the vehicle to be adhered by the adhesive-fixing portion 65. The first supporting leg 62 at a first upper end 68 is inserted and fixed in the first mount 61 which is formed of a general plastic material.

The second fixing unit 60' of the mounting fixture 80 has a second position adjusting unit which comprises a second mount 61' hinged by a second hinge 67' at an upper part (left-hand side of FIG. 1) of the main body 10 and a second supporting leg 62' fixed to the second mount 61'; and a hook-fixing member 66 to insert and fix the second supporting leg 62' between the front glass window 12 and the portion 11 of the vehicle to be adhered by the adhesive-fixing portion 65, formed on the second lower end 64' of the first supporting leg 62'.

The second supporting leg 62' has a second fold 63' to fold a second lower end 64' in a given length to adjust the angle and the height of the upper part of the main body 10 in the vehicle together with the second hinge 67'. The second fold 63' assumes the same structure as that of the first fold 63, in which v-shaped notches are formed at both faces of the second supporting leg 62' to be able to bend the second lower end 64' of the second supporting leg 62' at a given angle. Preferably, the second supporting leg 62' is formed of polyethylene (PE) to prevent the hook-fixing portion 66 from being easily cut or torn.

The second supporting leg 62' at a second upper end 68' is inserted and fixed in the second mount 61' which is formed of a general plastic material.

Figure 3:
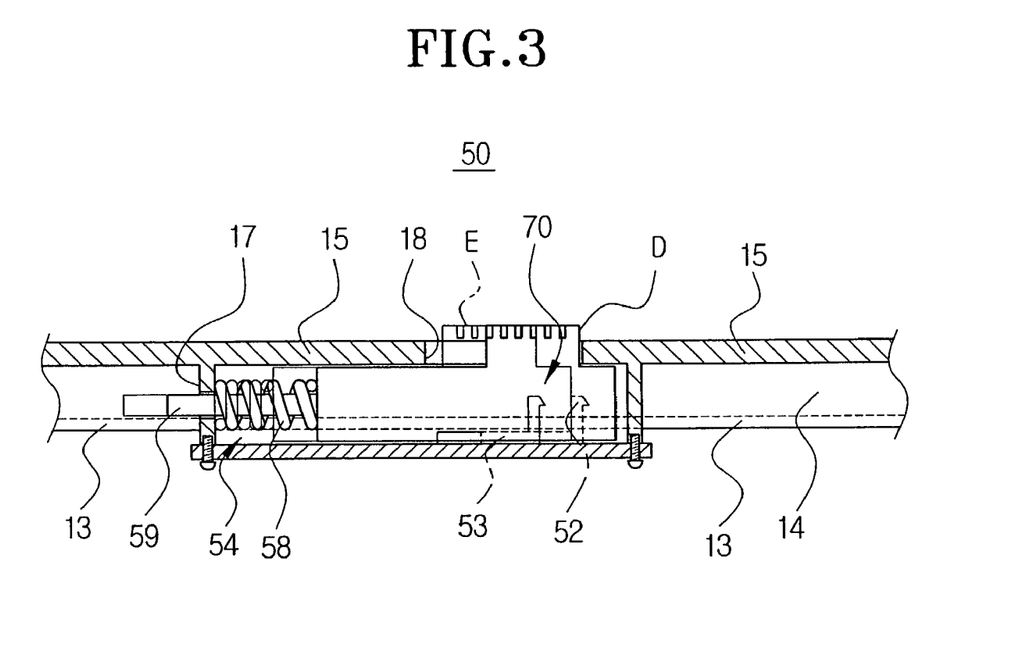
FIG. 3 is partial cross-sectional view illustrating a lock/release of the apparatus of the present invention taken along lines I—I of FIG. 1.
Figure 4:
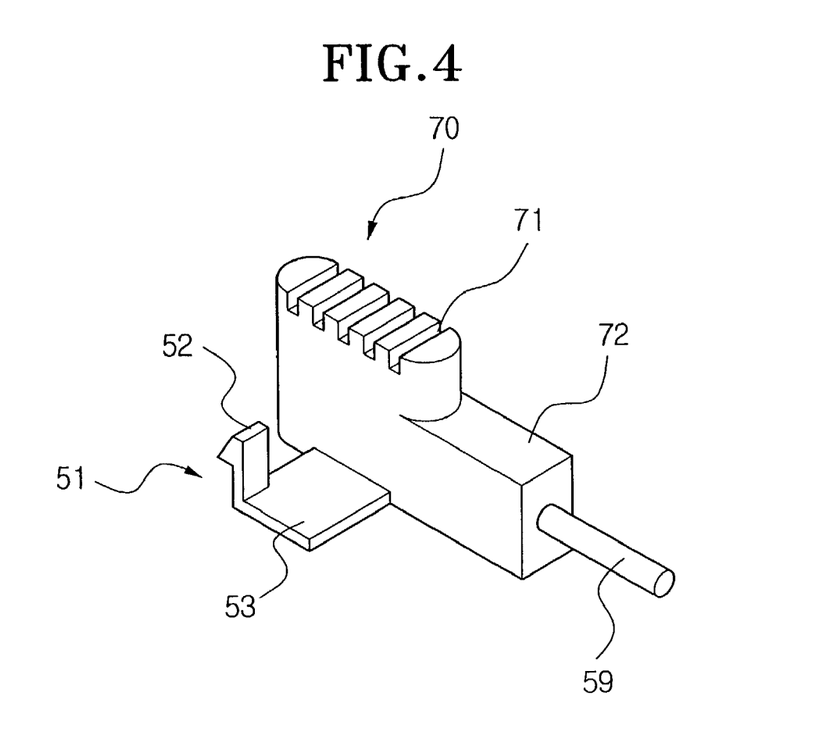
FIG. 4 is a perspective view of a locking unit and a releasing unit of the lock/release illustrated in FIG. 3.

Also, as illustrated in FIGS. 1, 3 and 4, the apparatus 200 of the invention further comprises a lock/release 50 which is positioned in a locking position D of locking up the PDA 100 to prevent the PDA 100 from being ejected in cooperation with the first and second lockers 20 and 30 when the PDA 100 is completely inserted into the receiving recess 16, and which can be moved by a user to a releasing position E of releasing the PDA 100 from the lock-up state to enable the PDA 100 to be ejected when the PDA 100 is to be removed, and an ejector 40 to lift the PDA 100 by a given distance to make the PDA easily removable when the lock/release 50 is moved to the releasing position E.

Referring to FIGS. 3 and 4, the lock/release 50 comprises a locking unit 51 to lock up the PDA 100 when the PDA 100 is inserted into the receiving recess 16, a releasing unit 70 connected with the locking unit 51 and disposed to be movable by a user to release the locking unit 51 from the lock-up state when the PDA 100 is to be removed, and an elastic returning unit 54 to provide an elastic force to ensure the locking unit 51 and the releasing unit 70 to be maintained in the locking position D of locking up the PDA 100.

Figure 7A:
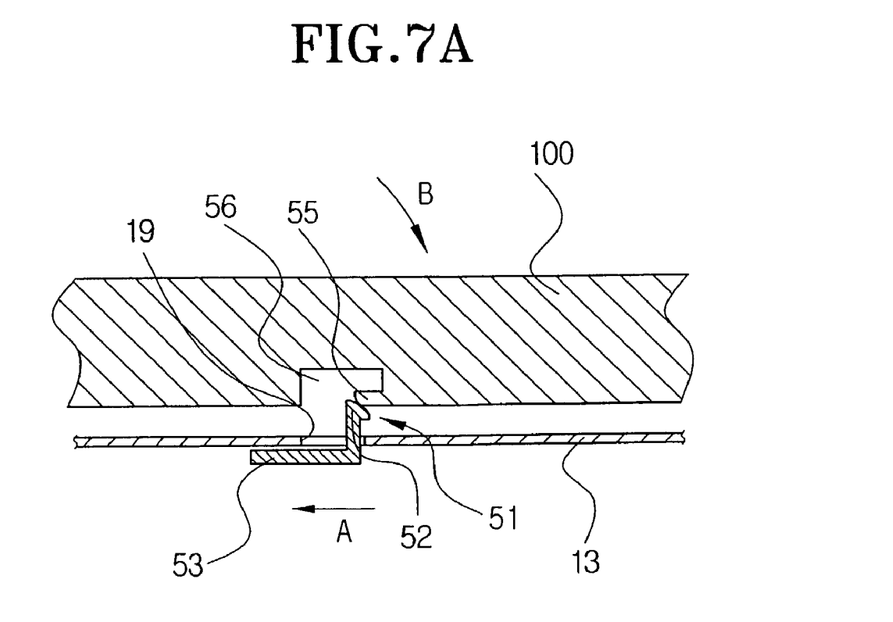
FIGS. 7A, 7B and 7C are partial cross-sectional views of the locking unit of the lock/release illustrated in FIG. 4.
Figure 7B:
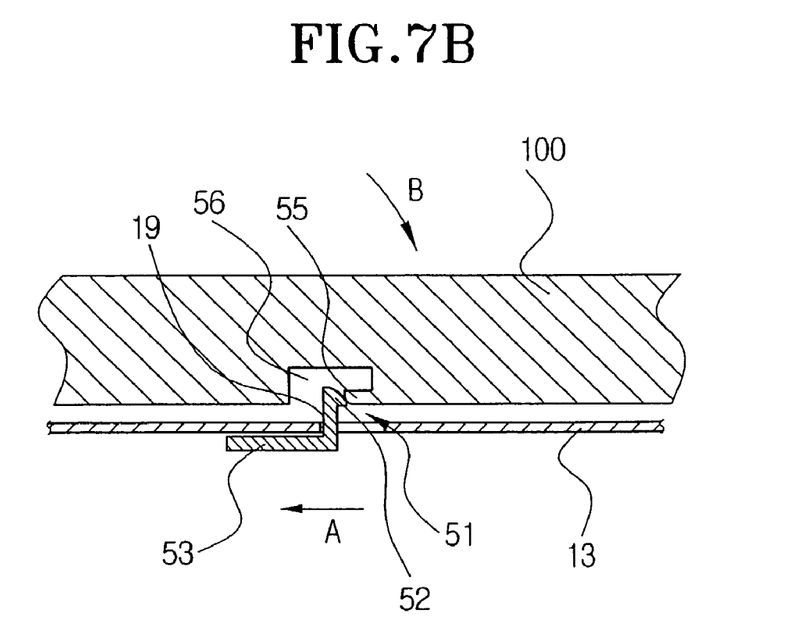
Figure 7C:
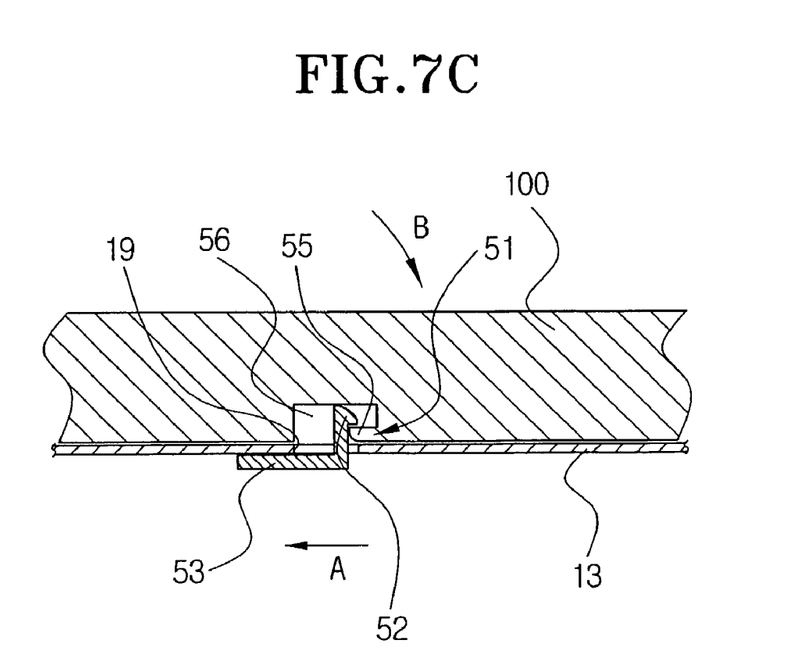

As illustrated in FIGS. 7A through 7C, the locking unit 51 comprises a locking groove 56 formed in a bottom surface of the PDA 100 and having an engaging member 55 with a lower inclined surface, and a hook member 52 disposed to be projected from the bottom 13 of the receiving recess 16 through a first guide hole 19 therein and to be movable between an engaging position engaging with the engaging member 55 and a disengaging position disengaging from the engaging member 55 to engage with or disengage from the engaging member 55 when the PDA 100 is inserted into or removed from the receiving recess 16, and a first guide member 53 to guide the movement of the hook member 52 at the inside of first guide hole 19.

Referring again to FIGS. 3 and 4, the releasing unit 70 has a release button 71 to move the hook member 52 between the engaging position and the disengaging position, connected with the first guide member 53 of the locking unit 51 and projected from a second guide hole 18 which is formed in an upper surface of the main body 10 at one side thereof, and a second guide member 72 to guide the movement of the release button 71 at the inside of the second guide hole 18.

Also, the elastic returning unit 54 comprises an elastic spring 58 disposed between the second guide member 72 and a supporting plate 17 extended below the bottom 13 of the main body 10, elastically to urge the hook member 52 and the release button 71 connected thereto to be moved to the engaging position, and a support rod 59 connected with the second guide member 72 of the releasing unit 70 to receive and support the elastic spring 58.

As illustrated in FIG. 5, the ejector 40 comprises an L-shaped leaf spring having an ejecting end 41 in which a tip is rounded and a fixing end 42 disposed below the bottom 13 of the main body 10. The ejecting end 41 is disposed at the bottom 13 of the receiving recess 16, so that it can be projected from or inserted into the bottom 13 through a hole 44 therein. The fixing end 42 is fixed on an under-surface of the bottom 13 of the main body 10 by a fixing member 43 such as a bolt.

It is an aspect of the invention that the L-shaped leaf spring forming the ejector 40 is formed to have an elastic force larger than that of the elastic hanger 31 of the second locker 30 to eject the PDA 100 by the given distance by disengaging the elastic hanger 31 of the second locker 30 from the elastic hanger-receiving groove 32 when the releasing part 70 of the lock/release 50 is moved by user to the releasing position E as shown in FIG. 3.

In another aspect of the invention, in order to prevent the PDA 100 from being excessively ejected and falling out of the apparatus 200 when the PDA 100 is ejected by the ejector 40, an ejecting height H, i.e., the elastic force of the ejector 40 and a returning height of the ejecting end 41 are set to ensure a lower portion 38 of the upper part of the PDA 100 is supported by the engaging end 35 of the second locker 30, as illustrated in FIG. 6A.

As explained above, since the apparatus 200 to mount the PDA 100 in accordance with the present invention has units 20, 30, 40 and 50 to mount the PDA 100 in and remove it from the main body 10 and mounting unit 80 to fix the main body 10 in the vehicle, mounting and removing the PDA 100 on and from the apparatus 200 of the invention, as well as setting up the apparatus 200 itself and the PDA 100 in the vicinity of the front glass window 12 of the vehicle to ensure the GPS receiver of the PDA 100 receives and transmits the radio waves from the satellites at the inside of the vehicle, can be easily carried out.

However, it will be noted that the apparatus 200 of the present invention is not limited to the structure as disclosed above, and if necessary, can include a unit to charge the PDA 100, a unit to connect the GPS receiver with an outside antenna of the vehicle, etc.

The process of fixing the apparatus 200 to mount the PDA 100 of the present invention in a vehicle will now be explained.

Figure 2:
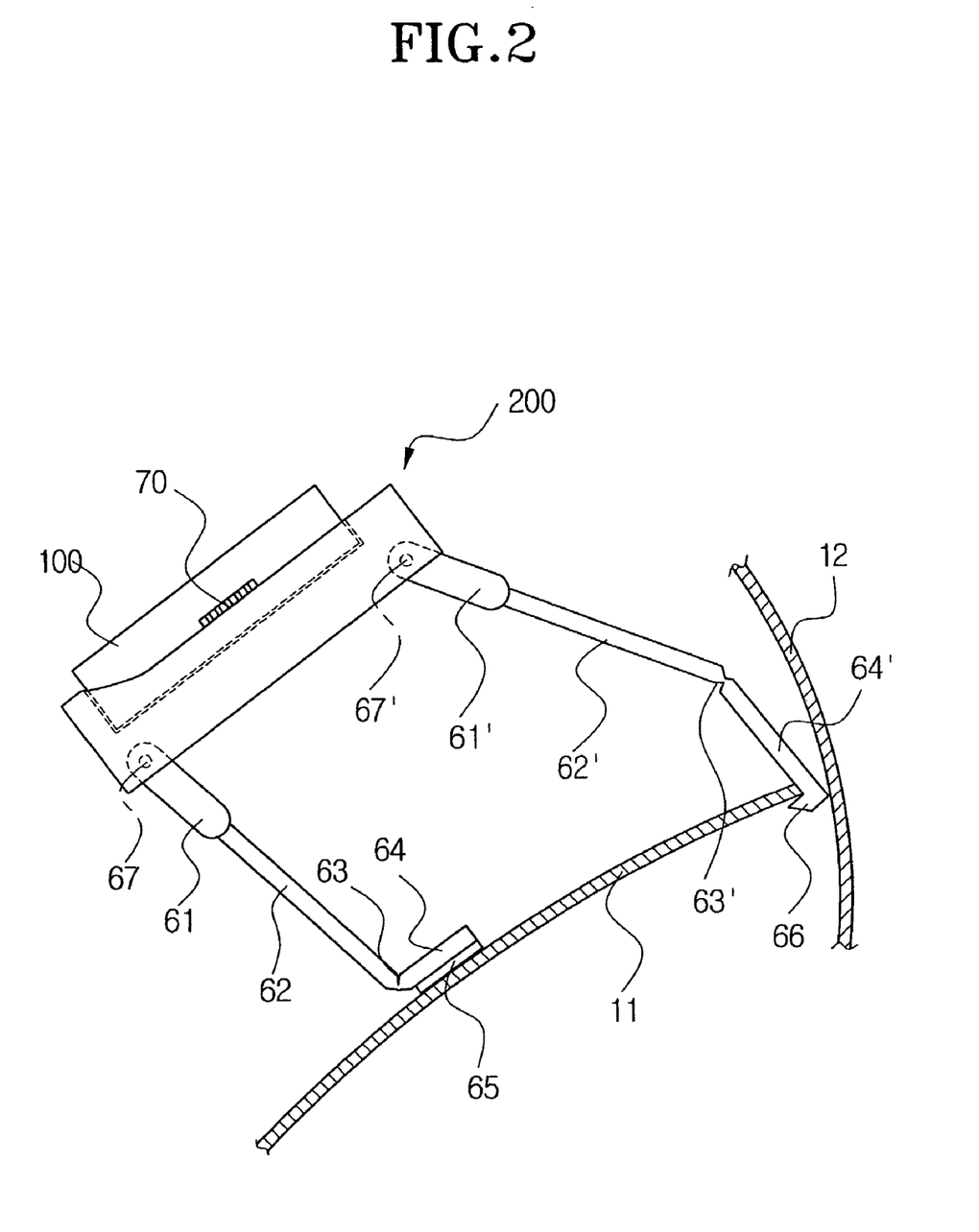
FIG. 2 is a side elevation view of the apparatus of the present invention illustrated in FIG. 1.

First, as illustrated in FIG. 2, the hook-fixing member 66 of the second fixing unit 60' is inserted and fixed in a narrow space between a front glass window 12 and the portion 11 of the vehicle on which the apparatus 200 is to be disposed. Then, the second fold 63' of the second supporting leg 62' is bent to adjust a height of the main body 10 disposed on the portion 11 of the vehicle. After the height of the main body 10 is adjusted, angles of first and second hinges 67 and 67' of first and second mounts 61 and 61' are adjusted to set a horizontal position of the main body 10. After the horizontal position of the main body 10 is set, the first lower end 64 of the first supporting leg 62 is bent according to the adjusted horizontal position of the main body 10 and the adhesive-fixing portion 65 is then adhered to the portion 11 of the vehicle. As a result, the apparatus 200 is disposed in the vicinity of front glass window 12 of the vehicle to ensure the GPS receiver contained in the PDA 100 freely receives and transmits radio waves from satellites at a position within the vehicle.

Next, the operation of mounting the PDA 100 in the apparatus 200 of the present invention will now be explained.

First, a lower part of the PDA 100 is inserted into a lower part of the receiving recess 16 to fit the first and second projection hangers 22 and 22' of the second locker 20 in first and second projection hanger-receiving grooves 21 and 21'.

Then, an upper part of the PDA 100 is pushed in an arrow direction B illustrated in FIG. 6A and inserted into the receiving recess 16 of the main body 10. At this time, the engaging end 35 of the elastic hanger 31 of the second locker 30 is pushed by the lower portion 38 of the upper part of the PDA 100 and then put into one side wall 14 of the main body 10. After that, when the PDA 100 keeps going down, a bottom surface of the PDA 100 comes in contact with the ejecting end 41 of the ejector 40 and pushes the ejecting end 41 down. At this time, a lower inclined surface of the engaging member 55 of the locking groove 56 formed at a bottom surface of the PDA 100 comes in contact with an upper inclined surface of the hook member 52 of the lock/release 50, as illustrated in FIG. 7A.

In this state, when the PDA 100 keeps going down, the lower inclined surface of the engaging member 55 comes into sliding contact with the upper inclined surface of the hook member 52, so that the hook member 52 is moved in an arrow direction A illustrated in FIG. 7B and put into the locking groove 56. As illustrated in FIG. 7C, as the slide contact between the lower inclined surface of the engaging member 55 and the upper inclined surface of the hook member 52 is finished, the hook member 52 is returned to a locking position engaging the engaging member 55 of the locking groove 56 by the elastic spring 58 (see FIG. 3) of the elastic returning unit 54. At this time, the engaging end 35 of the elastic hanger 31 is also engaged with the elastic hanger-receiving groove 32 of the PDA 100 and locked up. As a result, the PDA 100 is fixed in the receiving recess 16 of the main body 100.

Next, the operation of removing the PDA 100 from the apparatus 200 of the present invention will now be explained.

First, as illustrated in FIGS. 3 and 4, the release button 71 of the releasing part 70 is pushed down and slid by a user to be moved to a releasing position E. At this time, the hook member 52, which is engaged with the engaging member 55 of the locking groove 56, is moved in the arrow direction A illustrated in FIG. 7C to be disengaged with the engaging member 55. As a result, the ejecting end 41 of the ejector 40 forces the PDA 100 to be pushed up. At this time, since an elastic force of the ejector 40 is larger than that of the second locker 30, the engaging end 35 of the elastic hanger 31 of the second locker 30 is pushed by the lower portion 38 of the upper part of the PDA 100 and then put into the side wall 14 through a hole 36 formed in the side wall 14 of the main body 100. Also, since the elastic force of the ejector 40 and a returning height of the ejecting end 41 are set to ensure the PDA 100 to be ejected to a given height H, the lower portion 38 of the upper part of the PDA 100 is supported by the engaging end 35 of the elastic hanger 31 of the second locker 30. Thus, the PDA 100 is not excessively ejected from the receiving recess 16 to fall off the main body 10, but instead can be easily removed by the user.

As apparent from the foregoing description, it can be appreciated that the apparatus 200 of the invention provides effects which can easily carry out mounting and removing the PDA 100 thereon and therefrom as well as setting up the apparatus 200 itself and the PDA 100 in the vicinity of the glass window of the vehicle to ensure the GPS receiver of the PDA 100 freely receives and transmits the radio waves from the satellites at the inside of the vehicle.

Although a few embodiments of the present invention have been shown and described, it will be appreciated by those skilled in the art that changes may be made in these embodiments without departing from the principles and spirit of the invention, the scope of which is defined in the claims and the equivalents.

What is claimed is:

1. An apparatus to mount a mobile device such as a PDA or portable telephone in a vehicle comprising:
 a main body having a receiving recess to receive said mobile device;
 a locking unit to lock said mobile device in said receiving recess when said mobile device is inserted into said receiving recess; and
 a mounting fixture including at least one position adjusting unit having one end connected with said main body to adjust an angle and a height of said main body positioned in said vehicle, and at least one fixing unit formed on the other end of said position adjusting unit to fix said position adjusting unit in said vehicle,
 wherein said at least one position adjusting unit is formed of two pieces, each of which comprises:
 a support fixed to said main body; and
 a supporting leg connected with said support, having a fold with a lower end foldable at a given length to adjust the position of said main body together with said support.

2. The apparatus according to claim 1, wherein said fixing unit comprises:
 an adhesive-fixing portion to adhere said lower end of said fold of one among said two position adjusting units to a portion to be adhered in said vehicle; and
 a hook-fixing member to fix said lower end of said fold of the other one among said two position adjusting units by being inserted between a glass window and said portion to be adhered in said vehicle.

3. The apparatus according to claim 2, further comprising:
 a lock/release disposed to be movable between a locking position of locking up said mobile device to prevent said mobile device from being ejected in cooperation with said first and second lockers when said mobile device is completely inserted into said receiving recess and a releasing position of releasing said mobile device from the lock-up state to enable said mobile device to be ejected when said mobile device is to be removed; and
 an ejector to lift said mobile device by a given distance to make said mobile device easily removable when said lock/release is moved to said releasing position.

4. The apparatus according to claim 3, wherein said lock/release comprises:
 a locking unit to lock up said mobile device when said mobile device is inserted into said receiving recess;
 a releasing unit connected with said locking unit to release said locking unit from the lock-up state when said mobile device is to be removed; and
 an elastic returning unit to provide an elastic force to ensure said locking unit and said releasing unit are maintained in said locking position of locking up said mobile device.

5. The apparatus according to claim 4, wherein said locking unit comprises:
 a locking groove formed at a surface of said mobile device and having an engaging member; and
 a hook member disposed to be projected from a bottom of said receiving recess and movable between an engaging position engaging with said engaging member of said locking groove and a disengaging position disengaging from said engaging member to engage with or disengage from said engaging member when said mobile device is inserted into or removed from said receiving recess.

6. The apparatus according to claim 4, wherein said releasing unit comprises a release button to move said hook member between said engaging position and said disengaging position, connected with said hook member of said locking unit and projected from an upper surface of said main body at one side thereof.

7. The apparatus according to claim 4, wherein said elastic returning unit comprises:
 an elastic spring to elastically urge said hook member and said release button connected thereto to be moved to said engaging position, disposed between said release button and a support plate formed in said main body; and
 a support rod to receive and support said elastic spring, connected to said release button.

8. The apparatus according to claim 1, wherein said fold has a v-shaped notch structure.

9. The apparatus according to claim 2, wherein said supporting leg is formed of thermoplastic polyurethane from which the adhesive is not easily detached.

10. The apparatus according to claim 9, wherein a second position adjusting unit comprises a second supporting leg formed of polyethylene to prevent said hook-fixing portion from being easily cut or torn.

11. The apparatus according to claim 3, wherein said ejector comprises an elastic unit having an ejecting end disposed at said bottom of said receiving recess to alternately project from and be inserted into said bottom.

12. The apparatus according to claim 11, wherein said elastic unit comprises a leaf spring having said ejecting end in which a tip is rounded, and an elastic force larger than that of said elastic hanger of said second locker to eject said mobile device by said given distance by disengaging said elastic hanger of said second locker from said elastic hanger-receiving groove when said releasing unit of said lock/release is moved to said releasing position of releasing said locking unit from said lock-up state.

13. The apparatus according to claim 3, wherein the distance to lift said mobile device is predetermined such that a lower end of the upper part of the PDA is supported by said second locker at the lifted position.

14. A locking apparatus comprising:
 a first locker to support and secure a lower part of a mobile device into a recess of a mounting device;
 a second locker to elastically support and secure an upper part of the mobile device to the mounting device to lock the upper part of the mobile device when the mobile device is inserted into the receiving recess and to release the upper part of the mobile device from the lock state when a force to remove the mobile device from the receiving recess is applied to the mobile device; and
 a mounting fixture including at least one position adjusting unit having one end connected with said main body to adjust an angle and a height of said main body positioned in said vehicle, and at least one fixing unit formed on the other end of said position adjusting unit to fix said position adjusting unit in said vehicle, the at least one position adjusting device being bendable at a hinge and the at least one fixing unit being bendable at a fold.

15. The locking apparatus according to claim 14 wherein said first locker comprises:

at least one projection hanger formed to project from one wall of said receiving recess; and at least one projection hanger-receiving groove formed at a corresponding portion of said mobile device to receive said projecting hanger and thereby to support and secure said lower part of said mobile device.

16. The locking apparatus according to claim 14, wherein said second locker comprises:

an elastic hanger having a hanging end disposed at another wall of said receiving recess to be elastically projected from and inserted into said other wall; and an elastic hanger-receiving groove formed at the upper part of the mobile device to lock up the mobile device by engaging with said hanging end of said elastic hanger when the mobile device is inserted into said receiving recess.

17. The locking apparatus according to claim 16 wherein said elastic hanger comprises a leaf spring in which a tip of said hanging end is rounded, and said elastic hanger-receiving groove has an rounded upper edge to be in smooth contact with said hanging end of said elastic hanger when the mobile device is inserted into or removed from said receiving recess.

* * * * *